A. LEVEDAHL.
BICYCLE FRAME.
APPLICATION FILED JUNE 1, 1908.
946,143.
Patented Jan. 11, 1910.
2 SHEETS—SHEET 1.
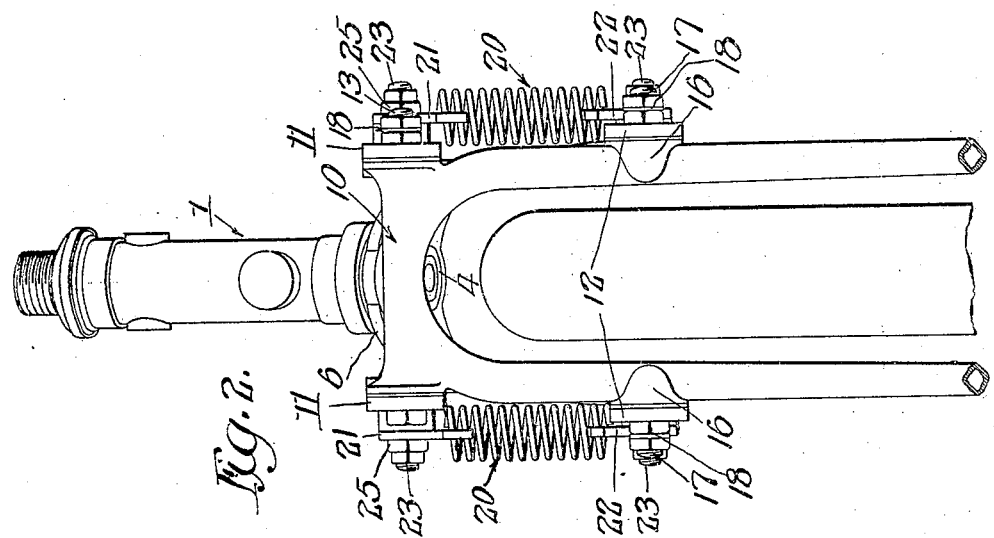
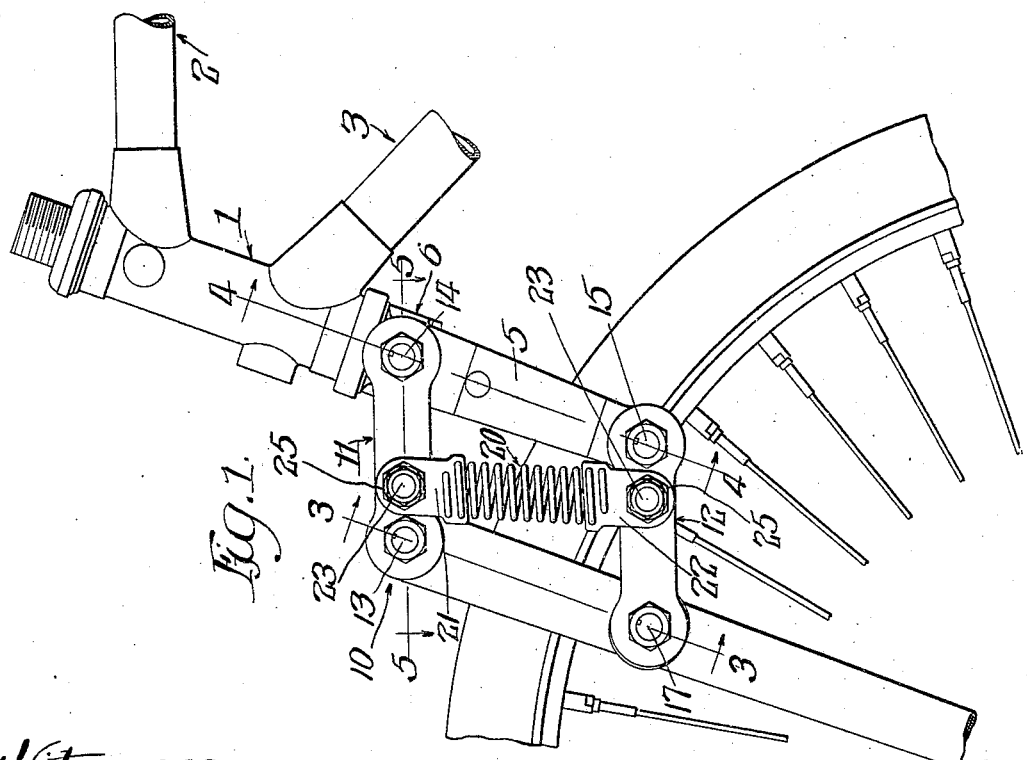
Witnesses:
G. R. Wilkins
P. H. Alfred
Inventor.
Axel Levedahl
by Poole & Brown
Attys

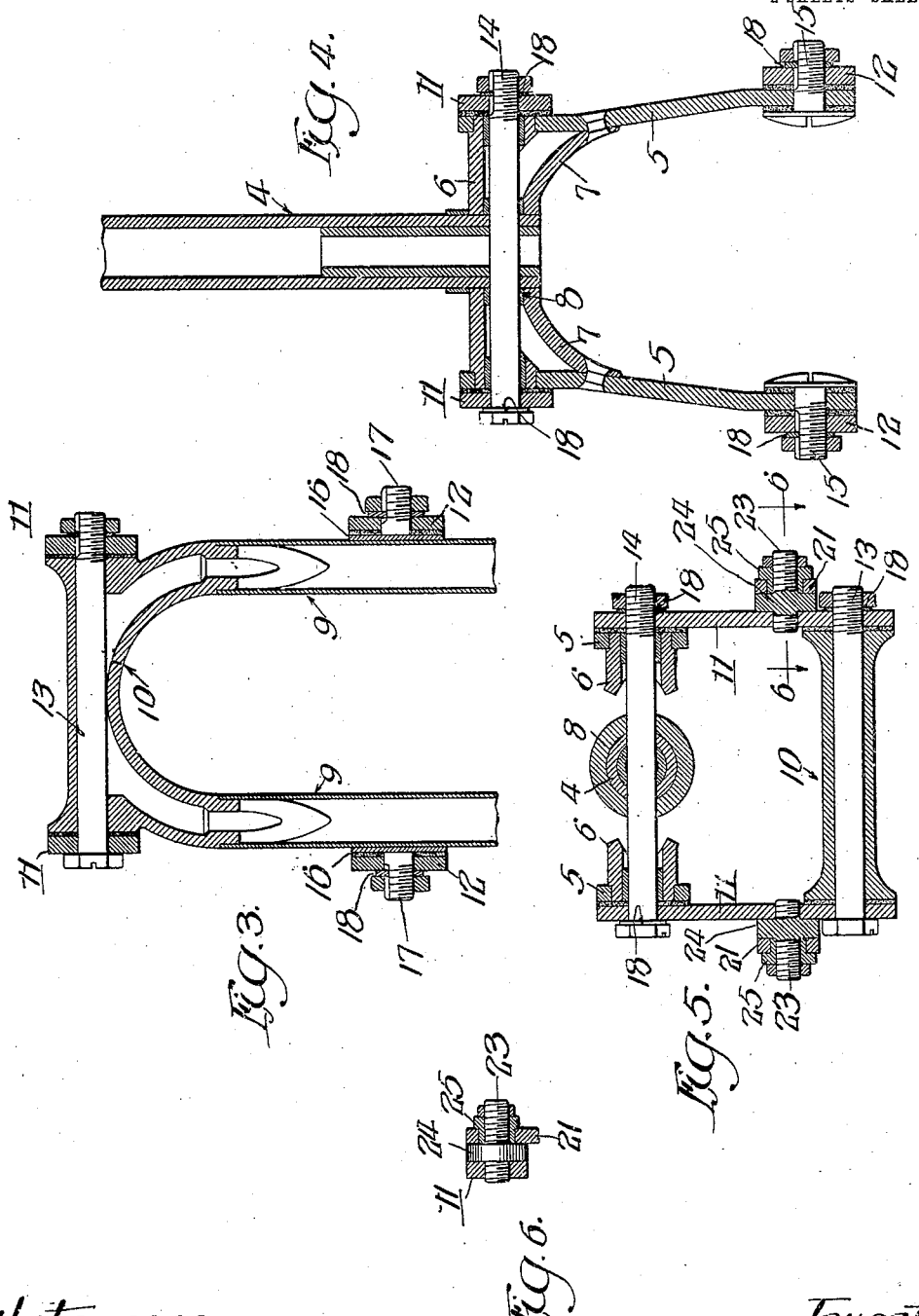

UNITED STATES PATENT OFFICE.

AXEL LEVEDAHL, OF AURORA, ILLINOIS, ASSIGNOR TO AURORA AUTOMATIC MACHINERY COMPANY, A CORPORATION OF ILLINOIS.

BICYCLE-FRAME.

946,143.  Specification of Letters Patent.  Patented Jan. 11, 1910.

Application filed June 1, 1908. Serial No. 435,864.

*To all whom it may concern:*

Be it known that I, AXEL LEVEDAHL, a citizen of the United States, and a resident of Aurora, in the county of Kane and State of Illinois, have invented certain new and useful Improvements in Bicycle-Frames; and I do hereby declare that the following is a full, clear, and exact description thereof, reference being had to the accompanying drawings, and to the numerals of reference marked thereon, which form a part of this specification.

This invention relates to bicycle and motor-cycle frames and refers more specifically to an improved spring connection, between the front fork and the steering head of a frame, so constructed and arranged as to yieldingly transmit the load on the frame to the front fork and to cushion or absorb shocks or blows transmitted to the frame in passing over rough and uneven road-ways.

The invention consists in the matters hereinafter set forth and more particularly pointed out in the appended claims.

In the drawings Figure 1 is a fragmentary side elevation of the forward part of a bicycle frame, showing my invention applied thereto. Fig. 2 is a front elevation of the parts shown in Fig. 1. Fig. 3 is a vertical section taken upon line 3—3 of Fig. 1. Fig. 4 is a vertical section taken upon line 4—4 of Fig. 1. Fig. 5 is a transverse section taken upon line 5—5 of Fig. 1. Fig. 6 is a fragmentary detail section taken upon line 6—6 of Fig. 5.

As illustrated in said drawings, 1 designates the tubular steering head of the frame to which are attached in the usual manner the top and bottom members 2 and 3, respectively, of the said frame. Within the said tubular head is located a steering spindle 4 which is provided at its end below the head with two lateral fork-arms 5, 5, which are rigidly secured thereto and extend downwardly therefrom with their lower ends at opposite sides of the front wheel rim. The said fork-arms 5, 5 are connected at their upper ends with the spindle 4 by means of a transverse tubular fitting member 6 and by an arched brace 7. Said member 6 is cut away at its central part, on its under side, and rigidly secured at its center to the said spindle 4 and at its ends to the said arms. The tubular ends of the transverse fitting member 6 are inserted and secured in circular apertures in the upper ends of said arms 5, 5; the ends of the tubular member being preferably reduced in diameter to form outwardly facing shoulders for contact with said arms. The lower end of the spindle 4 extends through the upper part of the fitting member 6 and through the center of the arched brace 7, and a collar 8 surrounds the spindle 4 between the fitting member 6 and the brace 7; said member 6, the brace 7 and collar 8 being secured to the spindle and to each other by brazing or otherwise. The ends of said brace 7 are secured to the fork-arms 5, 5, below the upper ends of the latter, by means of rivets.

The front fork, which supports the frame upon the axle of the front wheel, comprises two lateral fork-arms 9, 9 which are preferably tubular and elliptical in cross-sectional shape. The said fork-arms 9, 9 are rigidly connected with each other at their upper ends by means of a crown or top-fitting 10. The upper portion of the said top-fitting has the form of a transverse, horizontal tube provided with two curved downwardly extending arms which, at their lower ends, fit into and are secured to the said front fork members 9, 9. The upper part of the said front fork is located forward of the fork arms 5, 5 of the steering spindle 4 and is connected therewith by connecting means affording relative rising and falling movement between the front fork and the steering spindle and by a spring cushioning device acting to resist such relative movement. Referring to the construction illustrated in said connecting means, 11 and 12 indicate, respectively, upper and lower pairs of vertically swinging links, all of which are of the same length. The links 11, 11 of the upper pair of links are pivotally connected at their front ends with the top-fitting 10 of the front fork arms 9, 9 by means of a transverse horizontal pivot bolt 13 which extends longitudinally through the transverse tubular portion of the said top fitting. At their rear ends the said upper links 11, 11 are pivotally connected with the fork spindle 4 by means of a horizontal pivot bolt 14 which extends longitudinally through the transverse tubular fitting member 6, and through the fork spindle 4, the collar 8 thereon and the upper ends of the arms 5, 5. The rear ends of the lower links 12, 12 are pivotally connected with the lower ends of the lateral arms 5, 5 of the fork spindle by means of short pivot bolts 15, 15. Upon the outer faces of the front fork arms 9, 9 and at a distance below the pivot bolt 13, equal to the distance between the rear pivots of the upper and lower pairs of links are located lugs 16, 16 which are attached to the said arms 9, 9 preferably by brazing. Said lugs are provided with outwardly extending pivot studs 17, 17 by which the forward ends of the lower links 12, 12 are pivotally connected with the front fork arms. As a result of this construction all four pivotal points will maintain positions corresponding with the four angles of a parallelogram and the fork arms will be maintained in a position parallel with the arms 5, 5 of the steering spindle 4. The pivot bolts 13 and 14 for the forward and rear ends of the upper links 11, 11 are each provided at one end with a slotted hexagonal head, and screw-threaded at its other end and provided with a nut. The pivot bolts 15, 15 are provided at their inner ends with slotted heads and are screw-threaded and provided with nuts at their outer ends, and the pivot studs 17, 17, which are supported at their inner ends in the lugs 16, 16, are screw-threaded and provided with nuts at their outer ends. All of the said pivot bolts and studs are provided with washers 18, 18 interposed between the nuts thereon and the outer faces of the links, and having inwardly projecting lugs which engage longitudinal grooves in the bolts and studs in order to prevent the washers and nuts turning with the links.

For absorbing the shock which is transmitted to the fork by the road vibration there is employed a cushioning device consisting of two helical springs 20, 20 which are coiled partly open and are adapted to yield both under compression and tension. Said springs are arranged generally in a vertical position and connected at their upper ends with the links 11, 11 near the forward ends of the same and with the links 12, 12 near the rear ends of the latter. Each of the springs is attached at its ends to flat plates 21 and 22, with which the springs are connected by means of holes in the plates through which are threaded several of the end turns of the said springs. The upper ends of the plates 21, 21 are pivotally connected with upper links 11, 11 at points near the forward ends of said links, and preferably closely adjacent to the forward pivot bolt 13. The lower ends of said plates 22, 22 are pivotally connected with links 12, 12 at points near the rear ends of said links and immediately in advance of the rear pivot bolts 15, 15 of the said lower links. The means of pivotal connection between said plates 21 and 22 to the said links comprises pivot studs 23 which are provided with integral annular flanges 24, and the inner ends of which are screw-threaded and inserted into screw-threaded holes provided in the said links, the flanges 24 bearing against the outer faces of the links so as to hold the studs rigidly at right angles to the said links. Upon the outwardly extending portion of the said studs 23 are sleeves 25 on which the plates 21 and 22 are rotatively supported and which are provided with integral flanges which extend over and form bearing shoulders for the outer faces of the said plates. The outer ends of said studs are screw-threaded and provided with nuts by which the sleeves 25 are clamped endwise against the flanges 24 of the studs.

In the operation of the shock-absorbing device described, it will be evident that when the machine is loaded any depression of the front end of the machine frame, tending to swing the rear ends of the links 10 and 11 downwardly, will be resisted by the springs 20, 20 which, being coiled partly open and pivotally connected by means of the plates 21 and 22 with the upper and lower pairs of links, will be stretched or elongated when the rear ends of the lower links 12, 12 are depressed, the said springs tending to lift the steering spindle relatively to the front fork, and said springs acting to absorb shocks due to the passing of the front wheel over rough places in a roadway, or prevent the same being transmitted to the front of the frame. Moreover, the springs arranged as described act as shock-absorbers in both directions, the depression of the front end of the frame having a tendency to elongate the springs, while the recoil or upward movement of said front end of the frame is resisted by the compression of the said springs.

The construction of the fork spindle and the upper end of the front fork, and the arrangement of the links with respect thereto, including the fork arms on the steering spindle, and the links pivoted to the fork arms below the spindle and to the front fork at the top of the same and the front fork arms below the upper ends of the same, has the advantage over prior devices embracing links and spring devices applied to absorb shocks, of being very simple and strong, and occupying a small amount of space.

I claim as my invention:—

1. In a bicycle frame, the combination with a steering head and a steering spindle provided below the steering head with two lateral, depending fork arms, of a front fork, the upper end of which is located forward of said fork arms in the steering spindle, upper and lower pairs of vertically swinging links pivotally connected at their rear and forward ends with the said fork arms and with the front fork, and coiled springs connected at their upper ends with said upper links near the forward ends of the latter and at their lower ends with the lower links near the rear ends of the latter.

2. In a bicycle frame, the combination with a steering head and a steering spindle provided below said head with lateral depending fork-arms, of a front fork consisting of two fork-arms rigidly connected with each other at their upper ends, the upper ends of said fork-members being located forward of the fork-arms on the steering spindle, upper and lower pairs of vertically swinging links, the upper pair of links being pivotally connected at their forward ends to the tops of the front fork and at their rear ends to the upper ends of the fork-arms on the steering spindle, and the lower set of links being pivotally connected at their forward ends to the arms of the front fork between the top and lower ends of the latter and at their rear ends to the lower ends of the fork-arms of the steering spindle, and a spring cushioning device affording yielding connection between the said front fork and the steering spindle.

3. In a bicycle frame, the combination with a steering head, of a steering spindle provided below the steering head with two lateral depending fork-arms, a front fork comprising two fork-arms and a top fitting connecting said arms embracing a tubular, transverse, horizontal member rigidly attached at its ends to the upper ends of said arms, upper and lower pairs of vertically swinging links, the upper links being pivotally connected at their forward ends with the top of the front fork and at their rear ends with the upper ends of the fork-arms on the steering spindle, and the lower links being pivotally connected at the forward ends with the arms of the front fork between the top and lower ends of the latter and at their rear ends with the lower ends of said fork-arms on the steering spindle, the pivotal connection between the forward ends of the upper links and the top of the fork-arms being formed by a horizontal pivot bolt inserted through the tubular member of said top fitting and engaged at its ends with said upper links and a spring cushioning device yieldingly connecting the front fork with the steering spindle.

4. In a bicycle frame, the combination with a steering head, of a steering spindle provided below the steering head with two lateral, depending fork arms, a transverse tubular fitting member secured at its center to the lower end of the steering spindle and at its ends to the upper ends of the said fork arms, a curved brace member secured at its center to the lower end of said steering spindle and at its ends to the said fork arms at points below their upper ends, a front fork located forward of the said fork-arms on the steering spindle, upper and lower pairs of vertically swinging links pivotally connected at their forward ends with the top of the front fork and with the arms of the front fork below the top of the latter, a pivot bolt for the rear ends of said upper links, inserted through the said tubular fitting member and engaged at its ends with the said upper links, pivots connecting the rear ends of the lower pairs of links with the lower ends of the fork arms of the steering spindle, and a spring cushioning device applied to resist relative movement between said front fork and the fork arms on the steering head.

5. In a bicycle frame, the combination with a steering head, a steering spindle and front fork, of upper and lower pairs of vertically swinging links, pivotally connected at their forward and rear ends with said front fork and steering spindle, helical springs, and connecting plates attached to the ends of said springs and pivoted to the said links, said plates being provided each with a plurality of holes through which the end coils of the associated springs are threaded.

In testimony, that I claim the foregoing as my invention I affix my signature in the presence of two witnesses, this 27th day of May A. D. 1908.

AXEL LEVEDAHL.

Witnesses:
C. C. EDEN,
O. HAMMERHEAD.